United States Patent
Su et al.

(10) Patent No.: US 9,489,077 B2
(45) Date of Patent: Nov. 8, 2016

(54) OPTICAL TOUCH PANEL SYSTEM, OPTICAL SENSING MODULE, AND OPERATION METHOD THEREOF

(71) Applicants: Tzung-Min Su, Hsin-Chu (TW); Chih-Hsin Lin, Hsin-Chu (TW); Han-Ping Cheng, Hsin-Chu (TW); Ming-Tsan Kao, Hsin-Chu (TW); Yi-Hsien Ko, Hsin-Chu (TW)

(72) Inventors: Tzung-Min Su, Hsin-Chu (TW); Chih-Hsin Lin, Hsin-Chu (TW); Han-Ping Cheng, Hsin-Chu (TW); Ming-Tsan Kao, Hsin-Chu (TW); Yi-Hsien Ko, Hsin-Chu (TW)

(73) Assignee: PIXART IMAGING INCORPORATION, R.O.C., Hsin-Chu (TW)

( * ) Notice: Subject to any disclaimer, the term of this patent is extended or adjusted under 35 U.S.C. 154(b) by 143 days.

(21) Appl. No.: 13/624,842

(22) Filed: Sep. 21, 2012

(65) Prior Publication Data
US 2014/0085264 A1    Mar. 27, 2014

(30) Foreign Application Priority Data
Oct. 19, 2011 (TW) .............................. 100137822 A

(51) Int. Cl.
G06F 3/042 (2006.01)
G06F 3/041 (2006.01)
G06F 3/0488 (2013.01)

(52) U.S. Cl.
CPC .............. G06F 3/0416 (2013.01); G06F 3/042 (2013.01); G06F 3/0428 (2013.01); G06F 3/04883 (2013.01)

(58) Field of Classification Search
CPC ...... G06F 3/042; G06F 3/048; G06F 3/0428; G06F 3/0416; G06F 3/04883
See application file for complete search history.

(56) References Cited

U.S. PATENT DOCUMENTS

| 4,782,328 | A  | * | 11/1988 | Denlinger | G01S 5/16 250/221 |
|---|---|---|---|---|---|
| 7,175,438 | B2 | * | 2/2007 | Levy | 434/167 |
| 7,689,381 | B2 | * | 3/2010 | Lin | G06F 3/0428 178/18.09 |
| 7,789,381 | B2 |   | 9/2010 | Dunn et al. | |
| 2004/0140955 | A1 | * | 7/2004 | Metz | 345/166 |
| 2004/0140956 | A1 | * | 7/2004 | Kushler | G06F 3/04883 345/168 |
| 2006/0176283 | A1 | * | 8/2006 | Suraqui | 345/169 |
| 2009/0174679 | A1 | * | 7/2009 | Westerman | 345/173 |
| 2010/0110020 | A1 | * | 5/2010 | Reeves | G06F 3/04883 345/173 |
| 2010/0315337 | A1 |   | 12/2010 | Ferren et al. | |
| 2011/0141052 | A1 | * | 6/2011 | Bernstein et al. | 345/174 |
| 2011/0191705 | A1 | * | 8/2011 | Kitahashi | 715/764 |
| 2012/0223891 | A1 | * | 9/2012 | Patterson | G06F 3/04883 345/173 |

FOREIGN PATENT DOCUMENTS

| CN | 101931687 A |   | 12/2010 |
|---|---|---|---|
| CN | 101931687 A | * | 12/2010 |

\* cited by examiner

*Primary Examiner* — Andrew Sasinowski
*Assistant Examiner* — Brent D Castiaux
(74) *Attorney, Agent, or Firm* — Tung & Associates

(57) ABSTRACT

The present invention discloses an optical touch panel system, an optical sensing module, and an operation method using for the same system. The system recognizes a track of an object moving on or above a touch control surface to determine a corresponding gesture function; it includes a touch control surface, at least one image sensor, and a processor. The touch control surface includes at least two touch control areas. The image sensor captures a plurality of continuous pictures including the images of the objects. The processer determines which touch control area the object is moving on or above according to a starting position or a path of the track, and executes a gesture function corresponding to the track and the touch control area.

21 Claims, 4 Drawing Sheets

OPTICAL TOUCH PANEL SYSTEM, OPTICAL SENSING MODULE, AND OPERATION METHOD THEREOF

CROSS REFERENCE

The present invention claims priority to TW 100137822, filed on Oct. 19, 2011. The present invention is a continuation-in-part application of U.S. Ser. No. 13/561,759, filed on Jul. 30, 2012, and a continuation-in-part application of U.S. Ser. No. 13/606,942, filed on Sep. 7, 2012.

BACKGROUND OF THE INVENTION

1. Field of Invention

The present invention relates to an optical touch panel apparatus, an optical sensing module, and an operation method thereof, in particular to such optical touch panel apparatus and operation method which execute gesture functions by means of plural touch control areas.

2. Description of Related Art

Touch screen apparatuses are a kind of interactive apparatuses for users to directly and intuitively operate application software on screen. There are various types of touch screen apparatuses, and one of which is the optical touch panel.

FIG. 1 shows a prior art optical touch panel system 1 which is disclosed by U.S. Pat. No. 4,782,328. As shown in FIG. 1, the optical touch panel system 1 comprises two sensors 11 for capturing the images of an object 13 on a touch control area 12. A processor 14 is coupled to the two sensors 11, and calculates the sensing paths 15 linking the object 13 with the two sensors 11 by analyzing the images outputted by the sensors 11. The processor 14 also calculates the coordinates of the position of the object 13 according to the sensing paths 15. This optical touch panel system 1 requires two sensors 11 and therefore its cost is high.

FIG. 2 shows another prior art optical touch panel system 2 disclosed by Taiwanese Patent Publication No. 201003477, counterpart U.S. Pat. No. 7,689,381 B2. The optical touch panel system 2 comprises a mirror 21, two light sources 22, an image sensor 23 and a processor 24. The mirror 21 and the two light sources 22 are located around a touch control area 28. The mirror 21 is used to reflect the object 25 to generate a mirror image 26 of the object 25. The image sensor 23 captures the image of the object 25 and the mirror image 26. The processor 24 analyzes the sensing paths 27 passing the image of the object 25 and the mirror image 26, and calculates the coordinates of the object 25 according to the two sensing paths 27. The optical touch panel system 2 only needs one image sensor 23, and thus the cost is reduced.

Even though both of the foregoing optical touch panel systems (1, 2) can recognize the track of the object (which may be a finger or a device) and executes a corresponding gesture function such as page changes, display rotation or pulling down a menu, the prior art systems only use a single touch control area, and hence the available patterns of the track (e.g. horizontal sliding, up-down sliding, and circling, etc.) are limited and their corresponding gesture functions are also limited. Such conventional systems cannot provide more touch control functions or more gesture functions to meet various requirements, so they are less flexible and useful.

In view of above, the present invention overcomes the foregoing drawbacks by providing an optical touch panel apparatus, an optical sensing module, and an operation method which execute gesture functions by means of plural touch control areas. Different gesture functions can be defined in association with different touch control areas, and even the same track pattern can be defined as different gesture functions for different touch control areas, such that the number of the gesture functions can be multiplied.

SUMMARY OF THE INVENTION

An objective of the present invention is to provide an optical touch panel apparatus having multiple gesture functions.

Another objective of the present invention is to provide an operation method of an optical touch panel system.

Another objective of the present invention is to provide an optical sensing module used in the optical touch panel system.

To achieve the foregoing objectives, in one aspect, the present invention provides an optical touch panel system for recognizing a track of an object to determine a corresponding gesture function, comprising: a touch control surface for the object to move on or above to form the track, the touch control surface including at least two touch control areas; at least one image sensor for capturing a plurality of continuous pictures including images of the object; and a processor for determining which touch control area is active according to the track of the object in the pictures, and recognizing the track to execute a corresponding gesture function which is pre-defined in association with the active touch control area.

In one of embodiments, the processor determines a touch control area to be active when a starting point of the track is in this touch control area.

In one of embodiments, the processor determines a touch control area to be active according to a location of the image of the object in a first one of the pictures in an image-sensing window of the image sensor.

In one embodiment, the processor determines a touch control area to be active according to whether the track has a higher ratio existing in this touch control area than existing in another touch control area.

In one embodiment, the processor determines a touch control area to be active according to whether the track has a higher ratio existing in a corresponding region of an image-sensing window of the image sensor than existing in another region of an image-sensing window of the image sensor.

In one embodiment, at least one gesture function which is pre-defined in association with the one touch control area is different from at least one gesture which is pre-defined in association with another inactive touch control area.

In one embodiment, the number of the image sensors is two, and the two image sensors are disposed at two ends of one side of the touch control surface; the system further comprises a reflective element and at least one light emitting device disposed on two other sides of the touch control surface respectively.

In the foregoing embodiment, the two image sensors capture the image of the object, and the processor analyzes sensing paths through the images of the object to calculate the coordinates of the object.

In yet another aspect, the present invention provides an operation method of an optical touch panel system for recognizing a track of an object to determine a corresponding gesture function, comprising: providing a touch control surface for the object to move on or above to form the track, the touch control surface including at least two touch control areas; capturing a plurality of continuous pictures including images of the object; determining which touch control area is active according to the track; and recognizing the track to execute a corresponding gesture function which is pre-defined in association with the active touch control area.

In one embodiment, the track has a plurality of sampling points and a plurality of subsequent vectors for determining that the track belongs to the active touch control area.

In yet another aspect, the present invention provides an optical touch panel system for recognizing a track of an object to determine a corresponding gesture function, comprising: a touch control surface for the object to move on or above to form the track; at least one image sensor for capturing a plurality of continuous pictures including images of the object; and a processor for recognizing the track according to the images of the object in the pictures, and determining a corresponding gesture function according to a starting point of the track or a path of the track.

In yet another aspect, the present invention provides an optical sensing module for use in an optical touch panel system for identifying a track of an object, comprising: at least one image sensor for capturing a plurality of continuous pictures including images of the object; and a processor recognizing the track according to the images of the object in the pictures, and generating an output signal according to a starting point and a path of the track.

In one embodiment, the processor determines that the starting point or the path of the track is located in a predetermined touch control area of the touch control surface of the optical touch panel system, and the output signal of the processor includes information related to the touch control area.

The objectives, technical details, features, and effects of the present invention will be better understood with regard to the detailed description of the embodiments below, with reference to the drawings.

DESCRIPTION OF THE PREFERRED EMBODIMENTS

Figure 1:
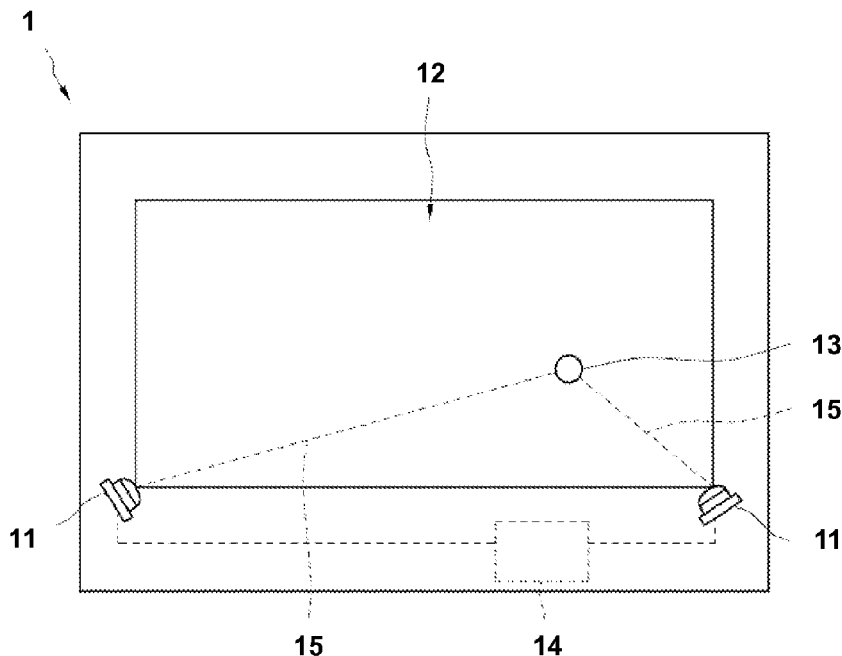
FIG. 1 shows a prior art optical touch panel system.
Figure 2:
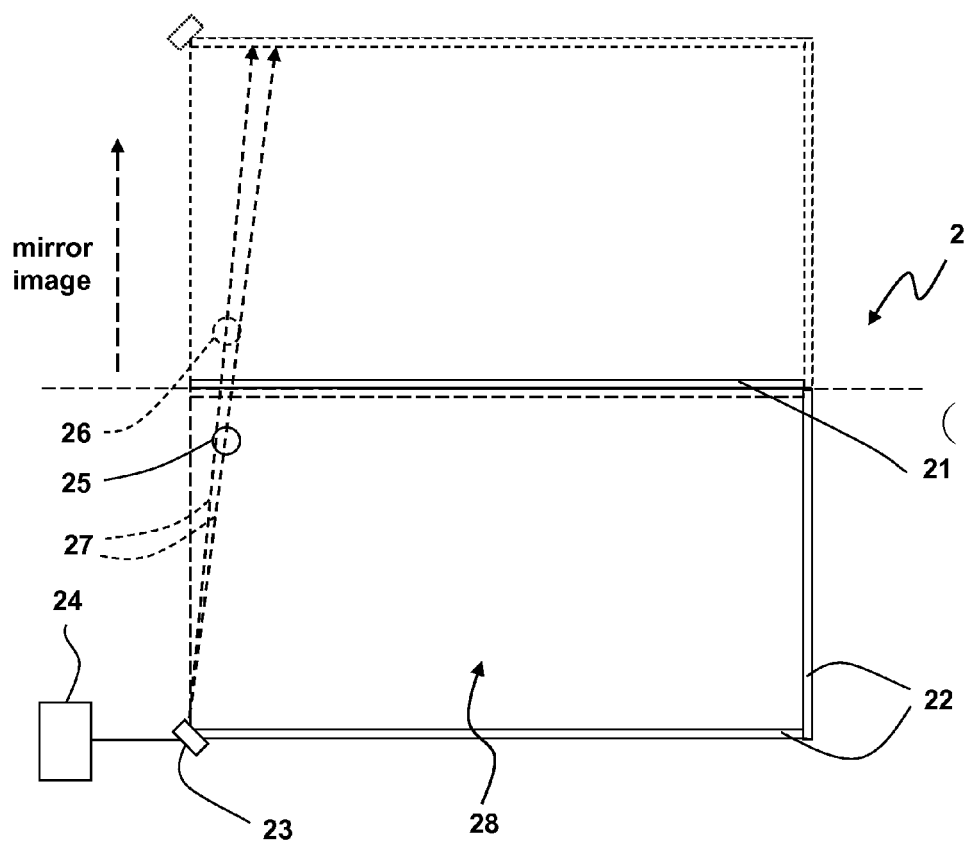
FIG. 2 shows another prior art optical touch panel system.

The application is improvement over the conventional touch panel systems in FIGS. 1 and 2. That is, the present invention can be applied to a touch panel system having a single or plural image sensors.

FIG. 3 shows a schematic diagram illustrating an embodiment of an optical touch panel system of the present invention. When an object 35 (e.g. a finger or a stylus pen) is on or above the touch control surface 38 of an optical touch panel system 3, the system can calculate the coordinate of the object 35 to position it. The optical touch panel system 3 comprises a first image sensor 331, a second image sensor 332, and a processor 34. The touch control surface 38 includes plural touch control areas; in this embodiment it is divided into a first touch control area 381 and a second touch control area 382. The first image sensor 331 and the second image sensor 332 are used to capture the image of the object 35 staying on or above either the first touch control area 381 or the second touch control area 382. In this embodiment, the first touch control area 381 is the inner area of the touch control surface 38, and the second touch control area 382 is the outer peripheral area of the touch control surface 38. However, the present invention is not limited to this arrangement; the pattern and the number of the divided areas can be modified.

The processor 34 is coupled to the two image sensors (331, 332), and it determines the sensing paths 37 linking the two image sensors (331, 332) to the object 34 by analyzing the images generated by the image sensors (331, 332). Moreover, according to the sensing paths 37, the coordinates of the position of the object 35 can be obtained. That is, the coordinates of the object 35 is the intersection of the sensing paths 37.

When the user rightwards slides the object 35 from a starting point to an ending point, the two image sensors (331, 332) continuously capture multiple frames (or pictures) including the images of the object 35. In this embodiment, the processor 34 determines in which touch control area (381 or 382) the object 35 exists according to the starting position (the leftest point at which the solid-line object 35 is) of the object 35 appearing in the first one of the pictures. Moreover, the track 39 of the images of the object 35 is recognized to execute a corresponding gesture function which is pre-defined in association with the active touch control area. In this case, the processor 34 of the embodiment determines that the starting position of the object 35 is in the first touch control area 381, so the touch control area is active, and the processor 34 identifies the track 39 of the object 35 as a rightwards linear slide. Thus, for example, the corresponding gesture function may be defined as: changing the currently displayed page to a next one.

Figure 3A:
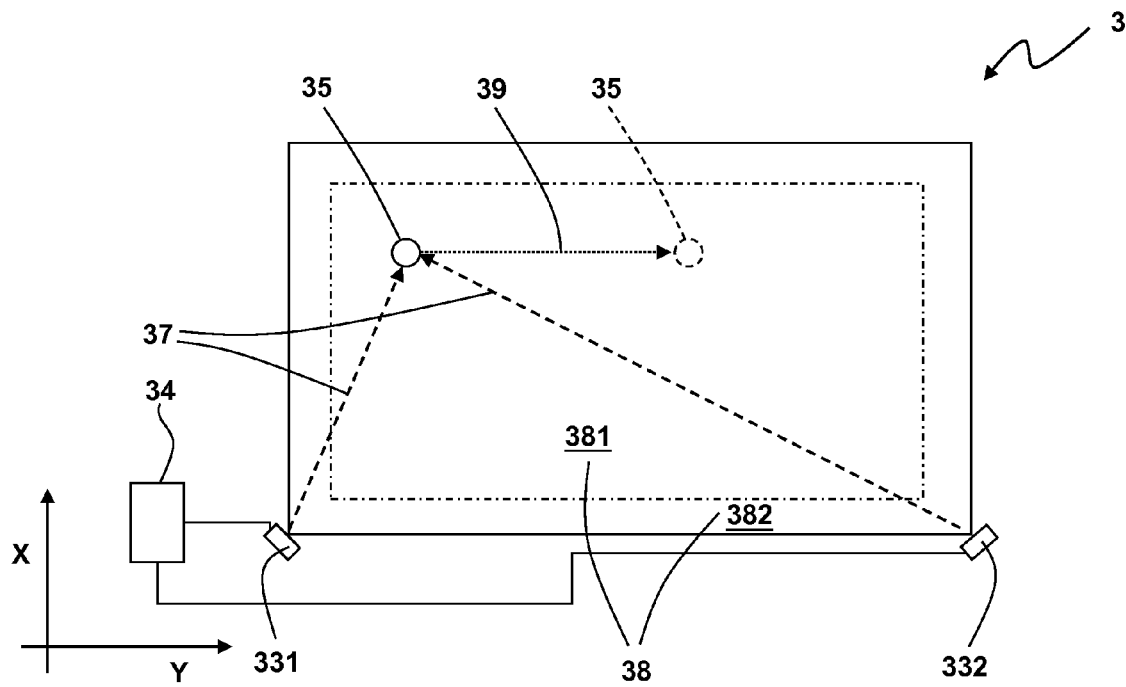
FIG. 3A is a schematic diagram illustrating an embodiment of an optical touch panel system of the present invention.
Figure 3B:
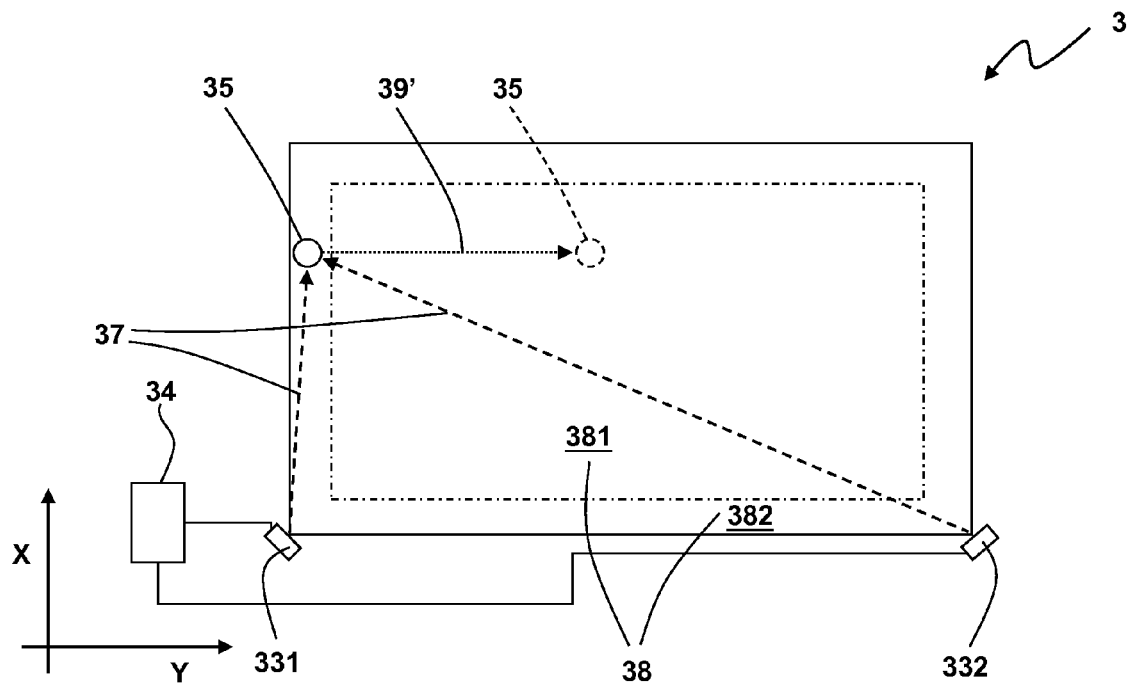
FIG. 3B is a schematic diagram illustrating a different operation of the optical touch panel system in FIG. 3A.

FIG. 3B is a schematic diagram illustrating a different operation of the optical touch panel system in FIG. 3A. The processor 34 in this figure determines that the starting position of the object 35 is in the second touch control area 382, and identifies the track 39' of the object 35 as a rightwards linear slide. Thus, a different gesture function which is pre-defined in association with the touch control area 382 is executed, such as pulling down the items of a menu. Compared with the operation of the optical touch panel system in FIG. 3A, even though the object 35 moves along the same track, the corresponding gesture functions are different. Different gesture functions corresponding to the track are pre-defined in association with different touch control areas (381 or 382), and which touch control area is active is determined by the starting position of the object 35. However, in a different embodiment, the object 35 can move along the same specified track in the different touch control areas (381 or 382), and the corresponding gesture function is the same for both touch control areas (381 and 382).

Figure 4:
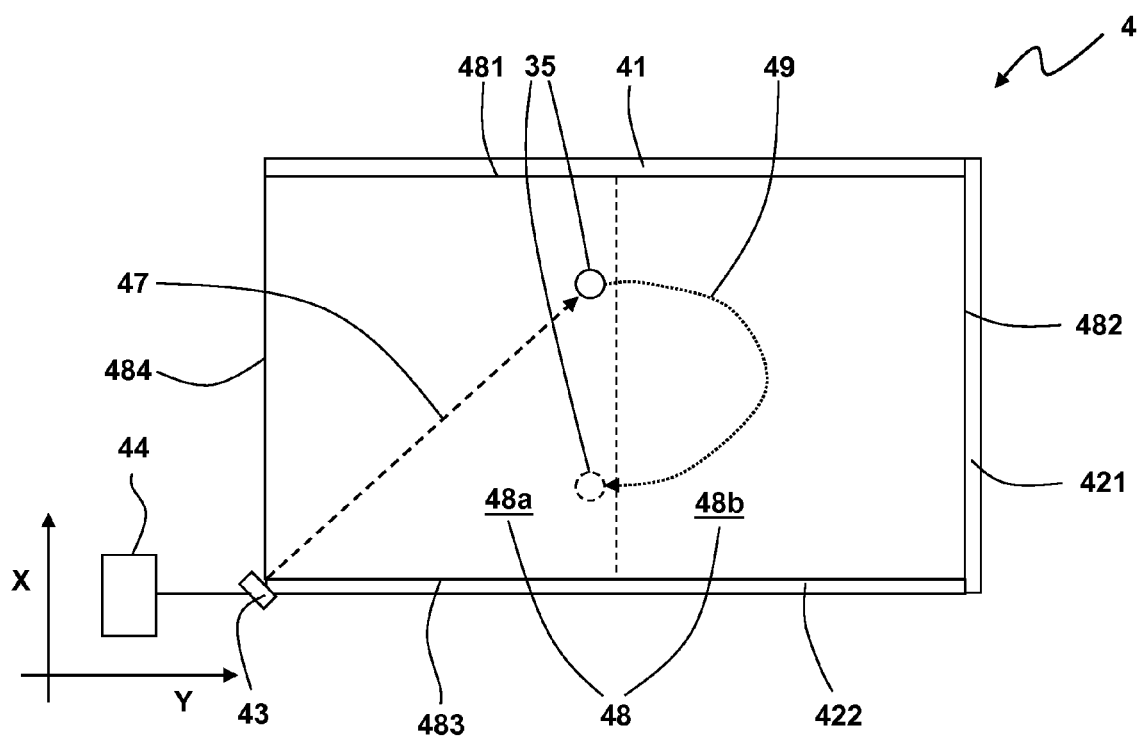
FIG. 4 is a schematic diagram illustrating an embodiment of an optical touch panel system of the present invention.

FIG. 4 is a schematic diagram illustrating an embodiment of an optical touch panel system of the present invention. When the object 35 is on or above the touch control surface 48 of an optical touch panel system 4, the system can calculate the coordinates of the object 35 for positioning it. The optical touch panel system 4 comprises a reflective element 41, a first light emitting device 421, a second light emitting device 422, an image sensor 43, and a processor 44. The reflective element 41 is disposed on the first side 481 of the touch control surface 48, and the first light emitting device 421 and the second light emitting device 422 are respectively disposed on the second side 482 and the third side 483 of the touch control surface 48, wherein the second side 482 and the third side 483 are adjacent to each other. In the shown embodiment, there is no reflective element or light emitting device disposed on the fourth side 484 of the touch control surface 48, but the patent scope of the present invention is not limited to the shown embodiment. The lengths and the numbers of the reflective element and the lighting emitting device can be rearranged, and the patent scope of the present invention should also cover these variations. The reflective element 41 may be, but is not limited to, a plane mirror. Each of the first light emitting device 421 and the second light emitting device 422 may be, but is not limited to, a linear light source capable of emitting invisible light. The image sensor 43 includes an image-sensing window and preferably a filter.

The reflective element 41, the first light emitting device 421, and the second light emitting device 422 are disposed on the sides of the touch control surface 48. The reflective element 41 is used to generate a mirror image of the object 35 (not shown in this figure; please refer to FIG. 2). The image sensor 43 can capture the image and the mirror image of the object 35. The processor 44 analyzes the sensing paths 47 (not shown in this figure; please refer to FIG. 2) passing the image of the object 35 and the mirror image, and calculates the coordinates of the object 35 according to the two sensing paths 47.

In this embodiment, the touch control surface 48 is divided into the first touch control area 48a and the second touch control area 48b. The image sensor 43 captures the image of the object 35 on or above either the first touch control area 48a or the second touch control area 48b. In the shown embodiment, the first touch control area 48a is the left half area of the touch control surface 48, and the second touch control area 48b is the right half area of the touch control surface 48; however, the present invention is not limited to this arrangement. The division pattern and the number of the divided areas are not limited to what are shown in the embodiment.

When the user downwards slides the object 35 from a starting point to an ending point along the curve track 49 in this figure, the image sensor 43 continuously captures plural pictures including the images of the object 35. Then, the processor 44 checks the starting position (the point at which the solid line object 35 is) of the object 35 appearing in the first one of the picture, and estimates which touch control area (48a or 48b) the track 49 covers more. Moreover, the track 49 of the images of the object 35 is recognized to execute a corresponding gesture function which is pre-defined in association with the active touch control area. For example, the processor 44 in this embodiment determines that the starting position of the object 35 is in the first touch control area 48a. But, by taking sampling points of the track 49 and calculating sequential vectors according to the sampling points, it is found that the majority portion (such as more than 50%) of the track 49 is located in the second touch control area 48b except the starting point and the ending point. That is, the active touch control area is determined by the proportion or ratio of the track 49, and the ratio of the track 49 in the second touch control area 48b to the overall track is higher than the ratio of the track 49 in the first touch control area 48a to the overall track. Furthermore, the track 49 of the object 35 is identified as a clockwise curve. Thus, for example, the currently displayed page is clockwise rotated by 180 degrees. The executed gesture function is pre-defined in association with the second touch control area 48b. If all or the majority portion of the track 49 falls in the first touch controls area 48a, the system can determine to execute gesture functions pre-defined in association with the first touch control area 48a, such as undoing the last change in the current screen and going back the previous one, or certain other specified function. This embodiment can be applied to an application where there is no physical indication of the boundary of the touch control areas, such as when the touch control surface 48 is one screen, and where the touch control surface have many areas. The user accordingly can easily input the gesture functions pre-defined in association with the touch control areas without precisely knowing the boundaries between them.

Figure 5A:
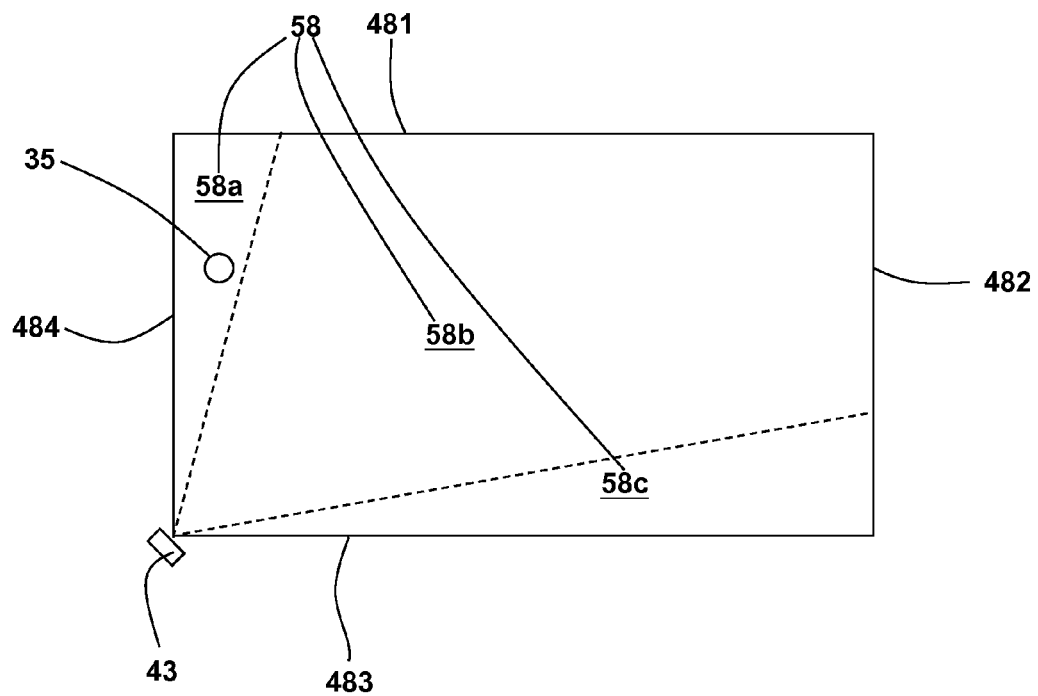
FIG. 5A is a schematic diagram illustrating an embodiment of a touch control surface of the present invention.
Figure 5B:
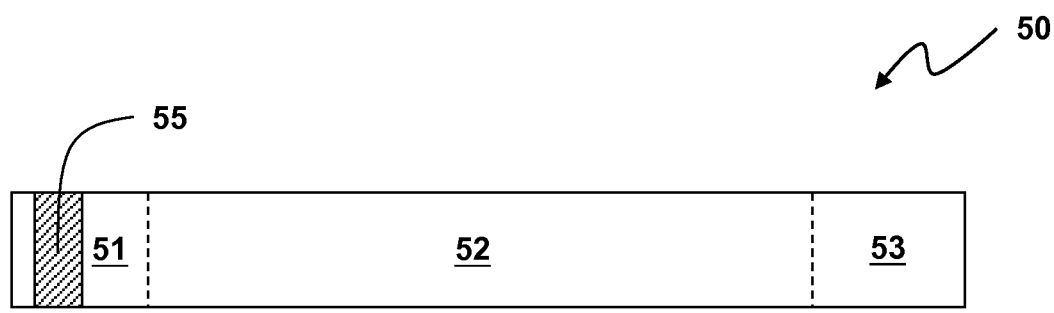
FIG. 5B shows an image-sensing window of the image sensor in FIG. 5A.

Calculating the position coordinates of the object 35 is only one of the possible ways to determine the touch control area in which the track exists. In another embodiment, since the object image occupies one or more pixels in the image-sensing window of the image sensor, where the pixels of the object image are located in the image-sensing window of the image sensor can also be used to directly determine the touch control area in which the track exists, and in this case it is not necessary to calculate the position coordinates of the object 35. FIG. 5A is a schematic diagram illustrating an embodiment of a touch control surface of the present invention, and FIG. 5B shows an image-sensing window of the image sensor in FIG. 5A. The touch control surface 58 is divided into a first touch control area 58a, a second touch control area 58b, and a third touch control area 58c. The image-sensing window 50 of the image sensor (or a frame taken by the image sensor) can be divided into a left area 51, a middle area 52, and a right area 53, wherein the left area 51 corresponds to the first touch control area 58a near the four side 484 of the touch control surface 48, the right area 53 corresponds to the third touch control area 58c near the third side 483 of the touch control surface 48, and the middle area 51 corresponds to the second touch control area 58b. As shown in FIG. 5B, the image 55 of the object 35 is located in the left area 51. Thus, the system determines that the object 35 exists in the first touch control area 58a near the fourth side 484. A track (not shown) of the object 35 can be recognized and an active touch control area can be determined according to for example but not limited to one of the methods described in the above, and a corresponding pre-defined gesture function can be executed.

In one embodiment, the processor can generate an output signal according to the starting point of the track or the path of the track, and the output signal includes information related to the active touch control area. In one embodiment, the system can further comprise a host (not shown in this figure), and the host executes a specified gesture function corresponding to the active touch control area according to the output signal.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the present invention is not limited to the division patterns and the numbers of the divided areas as shown in the foregoing embodiments, and they can be different. Furthermore, a touch control area can be determined to be active according to other ways to estimate the proportion or the ratio of the track existing in the touch control areas, and a specified gesture function corresponding to the area is executed. Thus, the present invention should cover all such and other modifications and variations, which should be interpreted to fall within the scope of the following claims and their equivalents.

What is claimed is:

1. An optical touch panel system for recognizing a track of an object to determine a corresponding gesture function, comprising:
   a touch control surface for the object to move on or above to form the track, the track having a starting point, an ending point and a path connecting the starting point and the end point, the touch control surface including at least two touch control areas, wherein each touch control area does not overlap and is distinguishable from any other touch control area, and the at least two touch control areas are adjacent to each other and there is a boundary between the at least two touch control areas, and the path includes a continuous trajectory which passes the at least two touch control areas and the boundary between the at least two touch control areas;
   at least one image sensor for capturing a plurality of continuous pictures including images of the object; and
   a processor for determining which touch control area is exclusively active according to all of the track of the object in the pictures, and recognizing all of the track to execute a corresponding single gesture function which is pre-defined in association with the exclusively active touch control area, wherein a plurality of different gesture functions are provided in each touch control area when the touch control area is active, and the corresponding single gesture function is determined according to the path;
   wherein the processor determines the touch control area to be exclusively active according to whether all of the track has a higher ratio existing in this touch control area than existing in another touch control area, and wherein at least one gesture function which is pre-defined in association with the exclusively active touch control area is different from at least one gesture which is pre-defined in association with another inactive touch control area.

2. The optical touch panel system of claim 1, wherein the processor determines the touch control area to be exclusively active when a starting point of all of the track is in this touch control area.

3. The optical touch panel system of claim 1, wherein the processor determines the touch control area to be exclusively active according to a location of the image of the object in a first one of the pictures in an image-sensing window of the image sensor.

4. The optical touch panel system of claim 1, wherein the processor determines the touch control area to be exclusively active according to whether all of the track has a higher ratio existing in a corresponding region of an image-sensing window of the image sensor than existing in another region of an image-sensing window of the image sensor.

5. The optical touch panel system of claim 1, wherein the number of the image sensors is two, and the two image sensors are disposed at two ends of one side of the touch control surface.

6. The optical touch panel system of claim 5, further comprising a reflective element and at least one light emitting device disposed on two other sides of the touch control surface respectively.

7. The optical touch panel system of claim 1, wherein the image sensor captures the image of the object and a mirror image formed by the reflective element, and the processor analyzes a sensing path through the image of the object and a sensing path through the mirror image to calculate the coordinates of the object.

8. An operation method of an optical touch panel system for recognizing a track of an object to determine a corresponding gesture function, comprising:
   providing a touch control surface for the object to move on or above to form the track, the track having a starting point, an ending point and a path connecting the starting point and the end point, the touch control surface including at least two touch control areas, wherein each touch control area does not overlap and is distinguishable from any other touch control area, and the at least two touch control areas are adjacent to each other and there is a boundary between the at least two touch control areas, and the path includes a continuous trajectory which passes the at least two touch control areas and the boundary between the at least two touch control areas;
   capturing a plurality of continuous pictures including images of the object;
   determining which touch control area is exclusively active according to all of the track; and
   recognizing all of the track to execute a corresponding single gesture function which is pre-defined in association with the exclusively active touch control area, wherein a plurality of different gesture functions are provided in each touch control area when the touch control area is active, and the corresponding single gesture function is determined according to the path;
   wherein the step of determining which touch control area is exclusively active according to all of the track includes: determining the touch control area to be exclusively active according to whether all of the track has a higher ratio existing in this touch control area than existing in another touch control area, and wherein at least one gesture function which is pre-defined in association with the exclusively active touch control area is different from at least one gesture which is pre-defined in association with another inactive touch control area.

9. The operation method of an optical touch panel system of claim 8, wherein the step of determining which touch control area is exclusively active according to all of the track includes: calculating a starting point of the track; and determining the touch control area to be exclusively active when a starting point of all of the track is in this touch control area.

10. The operation method of an optical touch panel system of claim 8, wherein the step of determining which touch control area is exclusively active according to all of the track includes: determining the touch control area to be active according to a location of the image of the object in a first one of the pictures in an image-sensing window of the image sensor.

11. The operation method of an optical touch panel system of claim 8, wherein the step of determining which touch control area is exclusively active according to all of the track includes: determining the touch control area to be exclusively active according to whether all of the track has a higher ratio existing in a corresponding region of an image-sensing window of the image sensor than existing in another region of an image-sensing window of the image sensor.

12. The operation method of an optical touch panel system of claim 8, wherein the track has a plurality of sampling points and a plurality of sequential vectors for determining to which active touch control area the track belongs.

13. An optical touch panel system for recognizing a track of an object to determine a corresponding gesture function, comprising:
a touch control surface for the object to move on or above to form the track, the track having a starting point, an ending point and a path connecting the starting point and the end point, the touch control surface including at least two touch control areas, wherein each touch control area does not overlap and is distinguishable from any other touch control area, and the at least two touch control areas are adjacent to each other and there is a boundary between the at least two touch control areas, and the path includes a continuous trajectory which passes the at least two touch control areas and the boundary between the at least two touch control areas;
at least one image sensor for capturing a plurality of continuous pictures including images of the object; and
a processor for recognizing the track according to the images of the object in the pictures, and determining a corresponding single gesture function according to which touch control area the starting point of all of the track exclusively belongs to, and wherein a plurality of different gesture functions are provided in each touch control area when the touch control area is exclusively active, and the corresponding single gesture function is determined according to the path;
wherein the processor determines that the starting point or the path of all of the track exists in a predetermined touch control area of the touch control surface and executes a corresponding gesture function which is pre-defined in association with the exclusively active touch control area.

14. The optical touch panel system of claim 13, wherein the number of the image sensors is two, and the two image sensors are disposed at two ends of one side of the touch control surface; the system further comprising a reflective element and at least one light emitting device disposed on two other sides of the touch control surface respectively.

15. The optical touch panel system of claim 13, wherein the image sensor captures the image of the object and a mirror image formed by the reflective element, and the processor analyzes a sensing path through the image of the object and a sensing path through the mirror image to calculate the coordinates of the object.

16. An optical sensing module for use in an optical touch panel system for identifying a track of an object, the optical touch panel system including at least two touch control areas, the track having a starting point, an ending point and a path connecting the starting point and the end point, the optical sensing module comprising:
at least one image sensor for capturing a plurality of continuous pictures including images of the object; and
a processor recognizing the track according to the images of the object in the pictures, and generating an output signal according to whether the starting point or a path of all of the track belongs to one of the touch control areas, wherein the at least two touch control areas are adjacent to each other and there is a boundary between the at least two touch control areas, and the path includes a continuous trajectory which passes the at least two touch control areas and the boundary between the at least two touch control areas;
wherein the output signal of the processor includes information related to the touch control area that the starting point or the path of all of the track belongs to, and wherein the processor determines whether the track belongs to the touch control area by the location of the starting point or by calculating a proportion of the continuous trajectory of all of the track in the touch control area,
wherein a plurality of different gesture functions are provided in each touch control area when the touch control area is active, wherein only one touch control area is exclusively activated by all of the track for executing a corresponding single gesture function, and wherein at least one gesture function which is pre-defined in association with the exclusively active touch control area that the starting point or the path of the track belongs to is different from at least one gesture which is pre-defined in association with another touch control area that the starting point or the path of the track does not belong to, and the corresponding single gesture function is determined according to the path.

17. The optical sensing module of claim 16, wherein the processor determines that the track exclusively belongs to the touch control area according to proportions of the continuous trajectory in regions of an image-sensing window of the image sensor.

18. The optical touch panel system of claim 1, wherein the track has a curve path.

19. The operation method of an optical touch panel system of claim 8, wherein the track has a curve path.

20. The optical touch panel system of claim 13, wherein the track has a curve path.

21. The optical sensing module of claim 16, wherein the track has a curve path.

* * * * *